US011714669B2

(12) United States Patent
Luo

(10) Patent No.: US 11,714,669 B2
(45) Date of Patent: Aug. 1, 2023

(54) VIRTUAL MACHINE PASSWORD RESET METHOD, APPARATUS, AND SYSTEM

(71) Applicant: HUAWEI CLOUD COMPUTING TECHNOLOGIES CO., LTD., Guizhou (CN)

(72) Inventor: Sibiao Luo, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 448 days.

(21) Appl. No.: 16/749,697

(22) Filed: Jan. 22, 2020

(65) Prior Publication Data

US 2020/0159563 A1 May 21, 2020

Related U.S. Application Data

(63) Continuation of application No. PCT/CN2018/096887, filed on Jul. 24, 2018.

(30) Foreign Application Priority Data

Jul. 28, 2017 (CN) ........................ 201710633447.6

(51) Int. Cl.
*G06F 9/455* (2018.01)
*G06F 21/45* (2013.01)

(52) U.S. Cl.
CPC .......... *G06F 9/45558* (2013.01); *G06F 21/45* (2013.01); *G06F 2009/45587* (2013.01)

(58) Field of Classification Search
CPC ....... G06F 9/45558; G06F 2009/45587; G06F 21/45; G06F 21/31; G06F 2221/2131
See application file for complete search history.

(56) References Cited

U.S. PATENT DOCUMENTS 9,935,940 B1 * 4/2018 DeMoss ................ H04L 63/083
2004/0024912 A1 * 2/2004 Fukao ................ H04N 1/00209 709/249

(Continued)

FOREIGN PATENT DOCUMENTS

CN 102073921 A 5/2011
CN 102402655 A 4/2012

(Continued)

OTHER PUBLICATIONS

Yan, Method, device and system for managing virtual machine, Apr. 27, 2016 (Year: 2016).*

(Continued)

*Primary Examiner* — Emerson C Puente
*Assistant Examiner* — Zhi Chen
(74) *Attorney, Agent, or Firm* — Conley Rose, P.C.

(57) ABSTRACT

A virtual machine password reset method includes a virtual machine first sending a password obtaining request to a cloud service computing node, the cloud service computing node querying a reset password of the virtual machine in a metadata server based on the password obtaining request, the cloud service computing node returning a password obtaining response based on a result of querying the reset password of the virtual machine in the metadata server, the virtual machine configuring the reset password as a password of the virtual machine, to complete virtual machine password reset.

13 Claims, 8 Drawing Sheets

Virtual machine
Console device
Cloud service computing node
100. Specify a first identifier in a metadata server
101. Determine whether the virtual machine has a password reset function
102. Obtain a reset password entered by a user
103. Password specifying request
104. Receive the password specifying request sent by the console device
105. Save the reset password in the password specifying request into the metadata server
106. Control the virtual machine to restart
107. Password obtaining request
108. Receive the password obtaining request sent by the virtual machine
109. Obtain the reset password of the virtual machine from the metadata server
110. Password obtaining response
111. Receive the password obtaining response returned by the cloud service computing node
112. Configure the reset password as a password of the virtual machine
113. Delete the reset password from the metadata server

(56) References Cited

U.S. PATENT DOCUMENTS

2004/0240670 A1* 12/2004 Man .................... G06F 21/34 380/277
2006/0271930 A1 11/2006 Letizi et al.
2007/0079143 A1* 4/2007 Fazal .................... G06F 21/31 713/193
2008/0120508 A1* 5/2008 Marconi .................... G06F 21/34 713/184
2011/0191834 A1 8/2011 Singh et al.
2012/0011577 A1* 1/2012 Mashimo .................... G06F 21/44 726/7
2013/0067229 A1* 3/2013 German .................... H04L 63/0846 713/171
2014/0089683 A1* 3/2014 Miller .................... H04L 9/085 713/193
2014/0090015 A1* 3/2014 Fuse .................... H04L 9/083 726/2
2014/0344805 A1* 11/2014 Shu .................... G06F 9/45558 718/1
2015/0033038 A1 1/2015 Goss et al.
2015/0067800 A1* 3/2015 Hosoda .................... H04N 1/4426 726/6
2015/0220745 A1* 8/2015 Nellitheertha .................... G06F 21/60 713/193
2016/0021197 A1* 1/2016 Pogrebinsky .................... G06F 9/5072 709/226
2017/0123836 A1* 5/2017 Nagy .................... G06F 9/5005
2017/0142157 A1* 5/2017 Cao .................... H04L 63/1433
2017/0339142 A1* 11/2017 Aluvala .................... H04L 63/0853
2018/0309580 A1* 10/2018 Jeon .................... H04W 4/70
2019/0129804 A1* 5/2019 Liu .................... G06F 11/1451

FOREIGN PATENT DOCUMENTS

| | | | |
|---|---|---|---|
| CN | 102685115 | A | 9/2012 |
| CN | 103475463 | A | 12/2013 |
| CN | 103875211 | A | 6/2014 |
| CN | 104079539 | A | 10/2014 |
| CN | 105260217 | A | 1/2016 |
| CN | 105530246 | A | 4/2016 |
| CN | 106529241 | A | 3/2017 |
| CN | 107577516 | A | 1/2018 |
| WO | 2009070668 | A1 | 6/2009 |
| WO | 2015027852 | A1 | 3/2015 |
| WO | 2017092671 | A1 | 6/2017 |

OTHER PUBLICATIONS

Geng, J., et al., "AD Remote Management Solution," 2017, 9 pages, with english abstract.

Ming, L., et al., "An Adaptive Compilation System Based on the Dalvik Virtual Machine," ACTA Electronica Sinica, vol. 41, No. 8, Aug. 2013, 6 pages.

* cited by examiner

VIRTUAL MACHINE PASSWORD RESET METHOD, APPARATUS, AND SYSTEM

CROSS-REFERENCE TO RELATED APPLICATIONS

This application is a continuation application of International Patent Application No. PCT/CN2018/096887, filed on Jul. 24, 2018, which claims priority to Chinese Patent Application No. 201710633447.6, filed on Jul. 28, 2017. The disclosures of the aforementioned applications are hereby incorporated by reference in their entireties.

TECHNICAL FIELD

This application relates to the field of virtualization and cloud computing, and in particular, to a virtual machine password reset method, apparatus, and system.

BACKGROUND

A virtualization technology is a technology in which one physical machine is virtualized into a plurality of independent hosts using a hypervisor. Each independent host is referred to as a virtual machine (VM), and a cloud service provider provides a virtual machine service for a user using the virtualization technology.

In a process of using a virtual machine by a user, if the user forgets a login password of the virtual machine or the login password expires, the user needs to reset the login password of the virtual machine, and then use the reset password to log in to the virtual machine.

Currently, the login password of the virtual machine is reset in the following manner. The original virtual machine whose login password needs to be reset is shut down, a system disk of the original virtual machine is unloaded through an operation in a console, and then the system disk is remotely mounted to another temporary auxiliary virtual machine, in this case, the system disk serves as a secondary disk in the temporary auxiliary virtual machine, and the user may modify a configuration file in the secondary disk, and then mount the system disk back to the original virtual machine and perform a restart operation, to complete virtual machine password reset.

However, with the foregoing manner of virtual machine password reset, the user needs to be technically skilled and familiar with a technology related to an operating system (OS), and needs to manually perform an operation with reference to a user guide, and the operation is relatively complex. In addition, the user needs to prepare an auxiliary virtual machine in advance, consuming an additional virtual machine resource in a virtual machine password reset process.

SUMMARY

In other approaches, to reset a virtual machine password, a user needs to be technically skillful, an operation is relatively complex, and an additional virtual machine resource needs to be consumed. To resolve such a problem, embodiments of the present disclosure provide a virtual machine password reset method, apparatus, and system. The technical solutions are as follows.

According to a first aspect, a virtual machine password reset method is provided, where the virtual machine password reset method includes sending, by a virtual machine, a password obtaining request to a cloud service computing node, where the password obtaining request is used to obtain a reset password of the virtual machine, receiving, by the virtual machine, a password obtaining response returned by the cloud service computing node, where the password obtaining response is generated after the cloud service computing node queries the reset password of the virtual machine in a metadata server, and when the password obtaining response includes the reset password, configuring, by the virtual machine, the reset password as a password of the virtual machine.

In this embodiment of the present disclosure, the virtual machine that needs to perform password reset sends the password obtaining request to the cloud service computing node, to request the reset password of the virtual machine. The cloud service computing node queries the reset password of the virtual machine in the metadata server based on the password obtaining request, and then generates the password obtaining response, and sends the password obtaining response to the virtual machine. When the password obtaining response includes the reset password, the virtual machine resets the password of the virtual machine using the reset password. The foregoing password reset process is automatically completed by the virtual machine, and the user does not need to manually perform an operation on a virtual machine operating system. The user is not required to be technically skillful, and the operation is simple. In addition, in the method, the user does not need to prepare an auxiliary virtual machine in advance, and no additional virtual machine resource is consumed.

With reference to the first aspect, in a first implementation of the first aspect, the reset password stored in the metadata server is an encrypted reset password, and the configuring, by the virtual machine, the reset password as a password of the virtual machine includes obtaining, by the virtual machine, a universally unique identifier (UUID) of the virtual machine, extracting, by the virtual machine, a salt from the encrypted reset password, generating, by the virtual machine, a key based on the UUID of the virtual machine and the salt, extracting, by the virtual machine, a ciphertext from the encrypted reset password, and decrypting the ciphertext using the key to obtain a plaintext password, and configuring, by the virtual machine, the plaintext password as the password of the virtual machine.

In this implementation, the reset password stored in the metadata server is an encrypted reset password such that security of the reset password can be ensured.

With reference to the first aspect or the first implementation of the first aspect, in a second implementation of the first aspect, the method further includes sending, by the virtual machine, an identifier obtaining request to the cloud service computing node, where the identifier obtaining request is used to obtain a first identifier, and the first identifier is used to indicate whether the virtual machine has a password reset function, receiving, by the virtual machine, an identifier obtaining response returned by the cloud service computing node, where the identifier obtaining response is generated after the cloud service computing node queries the first identifier in the metadata server, and if the identifier obtaining response indicates that the first identifier is not obtained, or the first identifier in the identifier obtaining response indicates that the virtual machine does not have the password reset function, specifying, by the virtual machine, the first identifier in the metadata server.

In this implementation, the virtual machine specifies the first identifier in the metadata server such that another device such as a console device may determine, by querying the first identifier, whether the virtual machine has the password reset function. Further, before specifying the first identifier, the virtual machine first attempts to obtain a first identifier in the metadata server to determine whether a first identifier is specified. If no first identifier is specified or a specified first identifier indicates that the virtual machine does not have the password reset function, a step of specifying the first identifier is performed.

In addition, instead of being directly specified in the metadata server, the first identifier is specified in the foregoing manner in the metadata server. In this way, the following problem can be avoided. When a relatively large quantity of metadata of virtual machines is saved in the metadata server, a large quantity of virtual machines concurrently write data into the metadata server to specify first identifiers, causing excessive load on the metadata server. By querying whether a first identifier has been specified in a virtual machine, a first identifier is specified when it is necessary, to effectively resolve the problem that excessive load is caused on the metadata server.

With reference to the second implementation of the first aspect, in a third implementation of the first aspect, the specifying, by the virtual machine, the first identifier in the metadata server includes sending, by the virtual machine, an identifier specifying request to the cloud service computing node such that the cloud service computing node specifies the first identifier in the metadata server.

In this implementation, specifying the first identifier is implemented by sending the identifier specifying request to the cloud service computing node.

With reference to the first aspect or the first implementation of the first aspect, in a fourth implementation of the first aspect, the method further includes sending, by the virtual machine, a password deletion request to the cloud service computing node such that the cloud service computing node deletes the reset password of the virtual machine from the metadata server.

In this implementation, after completing password reset, the virtual machine needs to delete the reset password from the metadata server, to avoid a process of repeatedly resetting a password using a same password. Deleting the reset password needs to be implemented by sending the password deletion request to the cloud service computing node.

According to a second aspect, a virtual machine password reset method is provided, where the method includes obtaining, by a console device, a reset password entered by a user, and sending, by the console device, a password specifying request to the cloud service computing node, where the password specifying request includes the reset password such that the cloud service computing node saves the reset password into a metadata server.

In this embodiment of the present disclosure, the user enters the reset password using the console device, and the console device finally saves the reset password into the metadata server by sending the password specifying request such that when performing password reset, a virtual machine may obtain the reset password from the metadata server, and then reset a password of the virtual machine using the reset password. The foregoing password reset process is automatically completed by the virtual machine, and the user does not need to manually perform an operation on a virtual machine operating system. The user is not required to be technically skillful, and the operation is simple. In addition, in the method, the user does not need to prepare an auxiliary virtual machine in advance, and no additional virtual machine resource is consumed.

With reference to the second aspect, in a first implementation of the second aspect, the obtaining, by a console device, a reset password entered by a user includes, when the console device obtains a virtual machine password reset instruction, determining, by the console device, whether a virtual machine has a password reset function, where the virtual machine password reset instruction is used to instruct the virtual machine to perform password reset, and when the virtual machine has the password reset function, obtaining, by the console device, the reset password.

In this implementation, before obtaining the reset password entered by the user and saving the reset password into the metadata server, the console device needs to first determine whether the virtual machine has the password reset function. If the virtual machine does not have the password reset function, the virtual machine password reset cannot be automatically completed even if the reset password is saved into the metadata server.

With reference to the first implementation of the second aspect, in a second implementation of the second aspect, the determining, by the console device, whether a virtual machine has a password reset function includes sending, by the console device, an identifier obtaining request to the cloud service computing node, where the identifier obtaining request is used to obtain a first identifier, and the first identifier is used to indicate whether the virtual machine has the password reset function, receiving, by the console device, an identifier obtaining response returned by the cloud service computing node, where the identifier obtaining response is generated after the cloud service computing node queries the first identifier in the metadata server, and determining, by the console device based on the identifier obtaining response, whether the virtual machine has the password reset function.

In this implementation, the console device obtains the first identifier in the metadata server by sending the identifier obtaining request to the cloud service computing node, and then determines, based on the first identifier, whether the virtual machine has the password reset function.

According to a third aspect, a virtual machine password reset method is provided, where the method includes receiving, by a cloud service computing node, a password obtaining request sent by a virtual machine, where the password obtaining request is used to obtain a reset password of the virtual machine, querying, by the cloud service computing node, the reset password of the virtual machine in a metadata server based on the password obtaining request, and sending, by the cloud service computing node, a password obtaining response to the virtual machine based on a result of querying the reset password of the virtual machine in the metadata server.

In this embodiment of the present disclosure, the virtual machine that needs to perform password reset sends the password obtaining request to the cloud service computing node, to request the reset password of the virtual machine. The cloud service computing node queries the reset password of the virtual machine in the metadata server based on the password obtaining request, and then generates the password obtaining response, and sends the password obtaining response to the virtual machine. When the password obtaining response includes the reset password, the virtual machine resets the password of the virtual machine using the reset password. The foregoing password reset process is automatically completed by the virtual machine, and the user does not need to manually perform an operation on a virtual machine operating system. The user is not required to be technically skillful, and the operation is simple. In addition, in the method, the user does not need to prepare an auxiliary virtual machine in advance, and no additional virtual machine resource is consumed.

With reference to the third aspect, in a first implementation of the third aspect, the method further includes receiving, by the cloud service computing node, an identifier obtaining request sent by the virtual machine, where the identifier obtaining request is used to obtain a first identifier, and the first identifier is used to indicate whether the virtual machine has a password reset function, querying, by the cloud service computing node, the first identifier in the metadata server based on the identifier obtaining request, and returning, by the cloud service computing node, an identifier obtaining response to the virtual machine based on a result of querying the first identifier in the metadata server.

With reference to the first implementation of the third aspect, in a second implementation of the third aspect, the method further includes receiving, by the cloud service computing node, an identifier specifying request sent by the virtual machine, where the identifier specifying request is used to specify the first identifier in the metadata server, and specifying, by the cloud service computing node, the first identifier in the metadata server.

With reference to the third aspect, or the first or the second implementation of the third aspect, in a third implementation of the third aspect, the method further includes receiving, by the cloud service computing node, a password deletion request sent by the virtual machine, where the password deletion request is used to delete the reset password from the metadata server, and deleting, by the cloud service computing node, the reset password from the metadata server.

In the foregoing implementation, the cloud service computing node receives the request sent by the virtual machine, and then performs a corresponding operation on metadata in the metadata server based on the request.

According to a fourth aspect, a virtual machine password reset method is provided, where the method includes receiving, by the cloud service computing node, a password specifying request sent by a console device, where the password specifying request includes the reset password, and saving, by the cloud service computing node, the reset password into a metadata server.

In this embodiment of the present disclosure, a user enters the reset password using the console device, and the console device finally saves the reset password into the metadata server by sending the password specifying request such that when performing password reset, a virtual machine may obtain the reset password from the metadata server, and then reset a password of the virtual machine using the reset password. The foregoing password reset process is automatically completed by the virtual machine, and the user does not need to manually perform an operation on a virtual machine operating system. The user is not required to be technically skillful, and the operation is simple. In addition, in the method, the user does not need to prepare an auxiliary virtual machine in advance, and no additional virtual machine resource is consumed.

With reference to the fourth aspect, in a first implementation of the fourth aspect, the saving, by the cloud service computing node, the reset password into a metadata server includes obtaining, by the cloud service computing node, a UUID of the virtual machine, generating, by the cloud service computing node, a random number as a salt, generating, by the cloud service computing node, a key based on the UUID of the virtual machine and the salt, encrypting, by the cloud service computing node, the reset password using the key to generate a ciphertext, and saving, by the cloud service computing node, the salt and the ciphertext together as an encrypted reset password into the metadata server.

In this implementation, when saving the reset password into the metadata server, the cloud service computing node needs to first encrypt the reset password such that security of the reset password can be ensured.

According to a fifth aspect, an embodiment of the present disclosure provides a virtual machine password reset apparatus, where the virtual machine password reset apparatus includes units configured to implement the method according to the first aspect, such as a sending unit, a receiving unit, and a configuration unit.

According to a sixth aspect, an embodiment of the present disclosure provides a virtual machine password reset apparatus, where the virtual machine password reset apparatus includes units configured to implement the method according to the second aspect, such as an obtaining unit and a sending unit.

According to a seventh aspect, an embodiment of the present disclosure provides a virtual machine password reset apparatus, where the virtual machine password reset apparatus includes units configured to implement the method according to the third aspect, such as a receiving unit, a query unit, and a sending unit.

According to an eighth aspect, an embodiment of the present disclosure provides a virtual machine password reset apparatus, where the virtual machine password reset apparatus includes units configured to implement the method according to the fourth aspect, such as a receiving unit and a saving unit.

According to a ninth aspect, an embodiment of the present disclosure provides a virtual machine password reset apparatus. The apparatus includes a memory and a processor connected to the memory. The memory is configured to store a software program and a module. When the processor is configured to run or execute the software program and the module that are stored in the memory, the processor may perform the method according to the first aspect.

According to a tenth aspect, an embodiment of the present disclosure provides a virtual machine password reset apparatus. The apparatus includes a memory and a processor connected to the memory. The memory is configured to store a software program and a module. When the processor is configured to run or execute the software program and the module that are stored in the memory, the processor may perform the method according to the second aspect.

According to an eleventh aspect, an embodiment of the present disclosure provides a virtual machine password reset apparatus. The apparatus includes a memory and a processor connected to the memory. The memory is configured to store a software program and a module. When the processor is configured to run or execute the software program and the module that are stored in the memory, the processor may perform the method according to the third aspect.

According to a twelfth aspect, an embodiment of the present disclosure provides a virtual machine password reset apparatus. The apparatus includes a memory and a processor connected to the memory. The memory is configured to store a software program and a module. When the processor is configured to run or execute the software program and the module that are stored in the memory, the processor may perform the method according to the fourth aspect.

According to a thirteenth aspect, an embodiment of the present disclosure further provides a computer readable medium configured to store program code executed by a virtual machine password reset apparatus, where the program code includes an instruction used to perform the method according to the first aspect.

According to a fourteenth aspect, an embodiment of the present disclosure further provides a computer readable medium configured to store program code executed by a virtual machine password reset apparatus, where the program code includes an instruction used to perform the method according to the second aspect.

According to a fifteenth aspect, an embodiment of the present disclosure further provides a computer readable medium configured to store program code executed by a virtual machine password reset apparatus, where the program code includes an instruction used to perform the method according to the third aspect.

According to a sixteenth aspect, an embodiment of the present disclosure further provides a computer readable medium configured to store program code executed by a virtual machine password reset apparatus, where the program code includes an instruction used to perform the method according to the fourth aspect.

According to a seventeenth aspect, an embodiment of the present disclosure further provides a communications chip, where the communications chip is applied to a virtual machine password reset apparatus, and includes a processor and a communications interface configured for signal receiving and sending. The processor and the communications interface are coupled using a bus, and the processor enables, by executing a program instruction, the communications chip or a communications system device loaded with the communications chip to perform the method according to any one of the first aspect or the foregoing possible implementations of the first aspect.

According to an eighteenth aspect, an embodiment of the present disclosure further provides a communications chip, where the communications chip is applied to a virtual machine password reset apparatus, and includes a processor and a communications interface configured for signal receiving and sending. The processor and the communications interface are coupled using a bus, and the processor enables, by executing a program instruction, the communications chip or a communications system device loaded with the communications chip to perform the method according to any one of the foregoing possible implementations of the second aspect.

According to a nineteenth aspect, an embodiment of the present disclosure further provides a communications chip, where the communications chip is applied to a virtual machine password reset apparatus, and includes a processor and a communications interface configured for signal receiving and sending. The processor and the communications interface are coupled using a bus, and the processor enables, by executing a program instruction, the communications chip or a communications system device loaded with the communications chip to perform the method according to any one of the foregoing possible implementations of the third aspect.

According to a twentieth aspect, an embodiment of the present disclosure further provides a communications chip, where the communications chip is applied to a virtual machine password reset apparatus, and includes a processor and a communications interface configured for signal receiving and sending. The processor and the communications interface are coupled using a bus, and the processor enables, by executing a program instruction, the communications chip or a communications system device loaded with the communications chip to perform the method according to any one of the foregoing possible implementations of the fourth aspect.

According to a twenty-first aspect, an embodiment of the present disclosure further provides a virtual machine password reset system, where the system includes a physical host, a console device, and a cloud service computing node. The physical host may run several virtual machines, where the virtual machine is configured to perform the method according to any one of the possible implementations of the first aspect, the console device is configured to perform the method according to any one of the possible implementations of the second aspect, the cloud service computing node is configured to perform the method according to any one of the possible implementations of the third aspect, and the cloud service computing node is further configured to perform the method according to any one of the possible implementations of the fourth aspect.

DESCRIPTION OF EMBODIMENTS

To make the objectives, technical solutions, and advantages of this application clearer, the following further describes the implementations of this application in detail with reference to the accompanying drawings.

A “module” mentioned in this specification is a program or an instruction that is stored in a memory and can implement some functions. A “unit” mentioned in this specification is a functional structure divided according to logic. The "unit" may be implemented by only hardware, or implemented by a combination of software and hardware.

Figure 1:
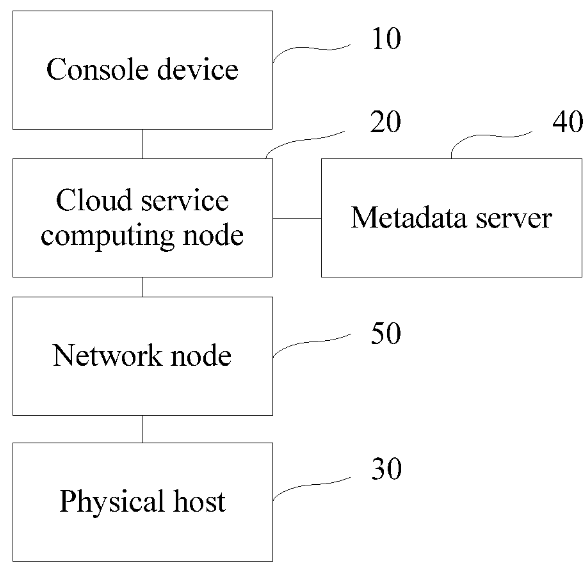
FIG. 1 is a schematic diagram of a virtual machine system according to an embodiment of the present disclosure.

For ease of the following description, the following first describes an application scenario of an embodiment of the present disclosure with reference to FIG. 1.

As shown in FIG. 1, an embodiment of the present disclosure provides a virtual machine system. The system includes a console device 10, a cloud service computing node 20, a physical host 30, a metadata server 40, and a network node 50.

As shown in FIG. 1, the cloud service computing node 20 is simultaneously connected to the console device 10, the physical host 30, and the metadata server 40.

In an implementation, the foregoing console device 10, the cloud service computing node 20, the physical host 30, and the metadata server 40 may be mutually independent physical devices. In another implementation, some or all of the console device 10, the cloud service computing node 20, the physical host 30, and the metadata server 40 are integrated into a same physical device.

When the console device 10, the cloud service computing node 20, the physical host 30, and the metadata server 40 are mutually independent devices, the cloud service computing node 20 may be directly connected to any one or more of the console device 10, the physical host 30, and the metadata server 40, or may be connected to any one or more of the console device 10, the physical host 30, and the metadata server 40 using a network node. For example, in FIG. 1, the physical host 30 and the cloud service computing node 20 are connected using the network node 50.

The console device 10 may present an interaction interface to a user by running an elastic cloud server (ECS) console, to implement interaction with the user. The physical host 30 carries a virtual machine. In the virtual machine system, a quantity of the physical hosts 30 is not limited, and a quantity of virtual machines carried on each physical host 30 is not limited. In an implementation, the cloud service computing node 20 implements a computing function in a cloud service by running OpenStack Nova, for example, controlling a virtual machine. OpenStack is well-known open-source cloud computing software in the industry, and Nova is a component responsible for virtual machine management. The metadata server 40 is configured to store various metadata in the virtual machine system, such as a UUID of a virtual machine, a host name, a key, and an Internet Protocol (IP) address.

Figure 2:
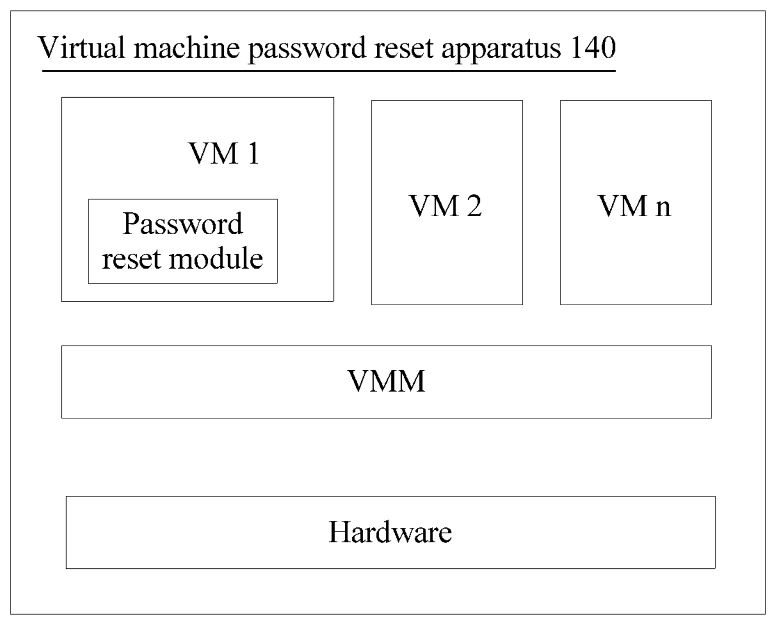
FIG. 2 is a schematic structural diagram of a virtual machine password reset apparatus according to an embodiment of the present disclosure.

FIG. 2 is a structural block diagram of a virtual machine password reset apparatus 140 according to an embodiment of the present disclosure. The virtual machine password reset apparatus 140 may be the foregoing physical host. The physical host may be various types of physical servers configured to provide a physical resource. The physical host runs a hypervisor, namely, a virtual machine monitor (VMM). The VMM is a virtualized layer between a virtual machine and computer hardware. Because resources of the physical host are virtualized into a resource pool, the resources in the resource pool are allocated to several virtual machines running on the physical host for use. A VM is a simulated virtual computer, and the VMM may isolate and manage a plurality of virtual machines running on the physical host, determine access of the virtual machines to underlying hardware, and virtualize an independent virtual hardware environment (including a processor, a memory, and an I/O device) for each virtual machine.

In this embodiment of the present disclosure, a password reset module runs on a virtual machine (for example, a VM 1) running on the physical host, and is configured to provide a user with a service of resetting an OS login password of the VM 1.

Figure 3:
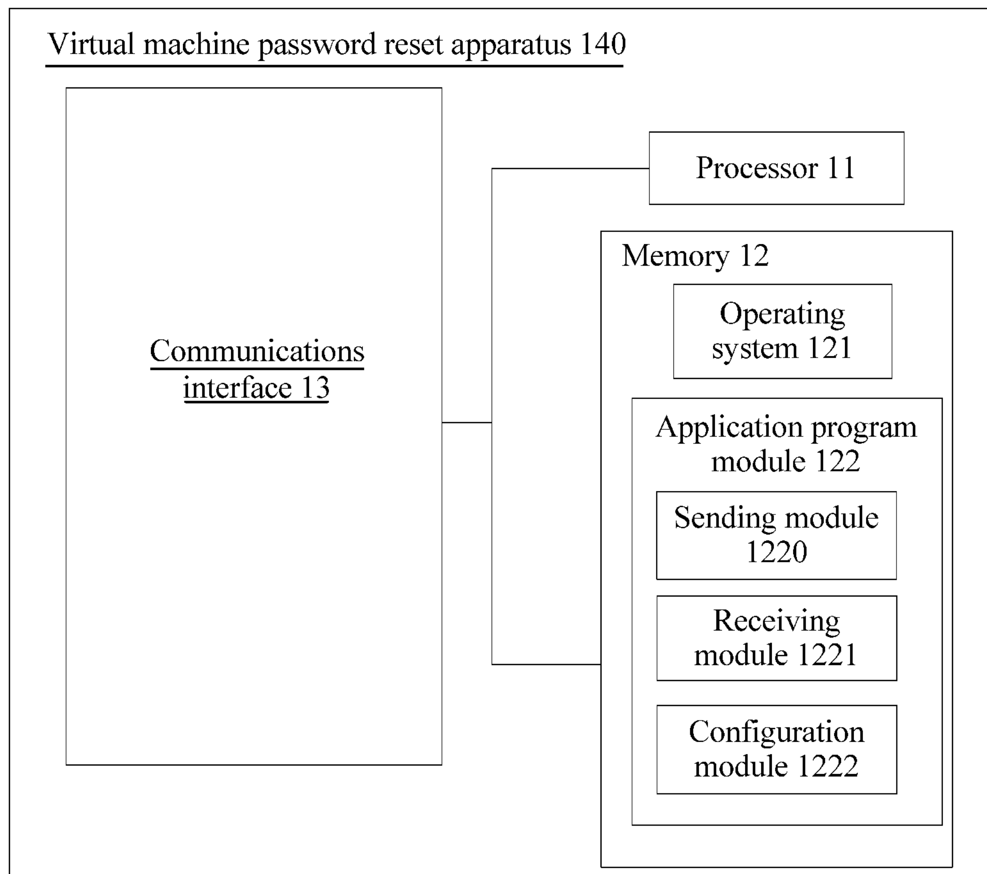
FIG. 3 is a schematic structural diagram of a virtual machine password reset apparatus according to an embodiment of the present disclosure.

Referring to FIG. 3, hardware of the virtual machine password reset apparatus 140 may include components such as a processor 11 with one or more processing cores, a memory 12 with one or more computer readable storage media, and a communications interface 13. The processor 11 may be connected to the memory 12 and the communications interface 13 using a bus. A person skilled in the art may understand that a structure shown in FIG. 3 imposes no limitation on the virtual machine password reset apparatus 140, and the apparatus may include more or fewer components than those shown in the figure, or may combine some components, or may have different component arrangements.

The processor 11 is a control center of the virtual machine password reset apparatus 140, and is connected to parts of the entire virtual machine password reset apparatus 140 using various interfaces and lines. By running or executing a software program and/or an application program module stored in the memory 12 and invoking data stored in the memory 12, the processor 11 performs various functions and processes data of the virtual machine password reset apparatus 140, to perform overall monitoring on the virtual machine password reset apparatus 140. Optionally, the processor 11 may include one or more processing units, and the processing unit may be a central processing unit (CPU), a network processor (NP), or the like.

The communications interface 13 may be implemented as a communications chip. The communications chip may include a receiving module, a transmitting module, a modem module, and the like, and is configured to modulate and demodulate information, and receive or send the information. The communications interface 13 is controlled by the processor 11.

The memory 12 may be configured to store various data, such as various configuration parameters, and a software program and/or an application program module. The software program and/or the application program module may be executed by the processor 11. The memory 12 may mainly include a program storage area and a data storage area, where the program storage area may store an operating system 121 and an application program module 122 required by at least one function, such as a sending module, a receiving module, and a configuration module, and the data storage area may store data created based on use of the virtual machine password reset apparatus 140, for example, a reset password. In addition, the memory 12 may include a high-speed random access memory, and may further include a non-volatile memory, for example, at least one magnetic disk storage device, a flash memory device, or another volatile solid-state storage device. Correspondingly, the memory 12 may further include a memory controller, to enable the processor 11 to access the memory 12.

The application program module 122 includes at least a sending module 1220 configured to send a password obtaining request, a receiving module 1221 configured to receive a password obtaining response, and a configuration module 1222 configured to configure a password.

The sending module 1220 is configured to send the password obtaining request to a cloud service computing node, where the password obtaining request is used to obtain a reset password of a virtual machine, the receiving module 1221 is configured to receive the password obtaining response returned by the cloud service computing node, where the password obtaining response is generated after the cloud service computing node queries the reset password of the virtual machine in a metadata server, and the configuration module 1222 is configured to, when the password obtaining response includes the reset password, configure the reset password as the password of the virtual machine.

Figure 6:
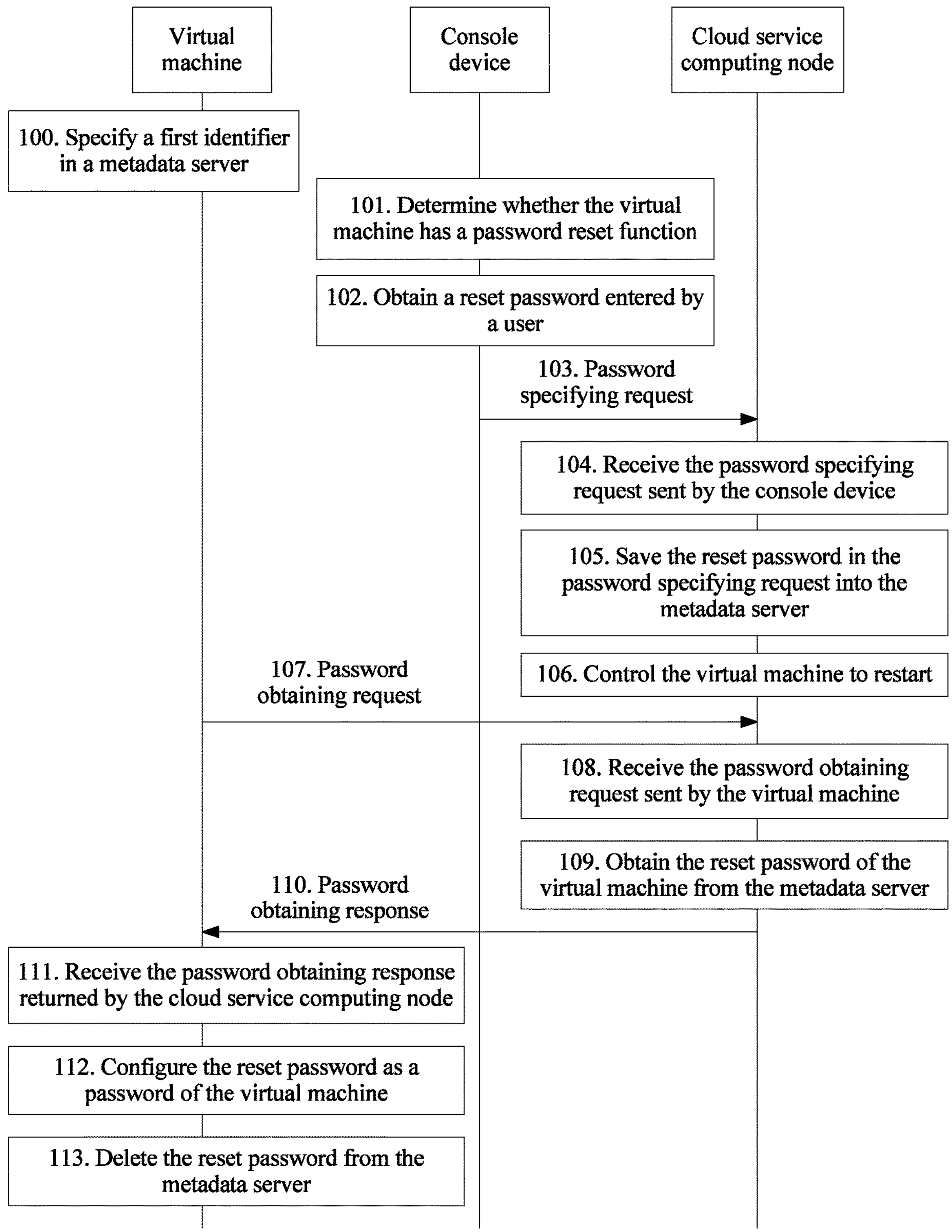
FIG. 6 is a flowchart of a virtual machine password reset method according to an embodiment of the present disclosure.

Optionally, the processor 11 is configured to execute modules in the application program module 122, to implement steps in FIG. 6 that need to be performed by the virtual machine.

Figure 4:
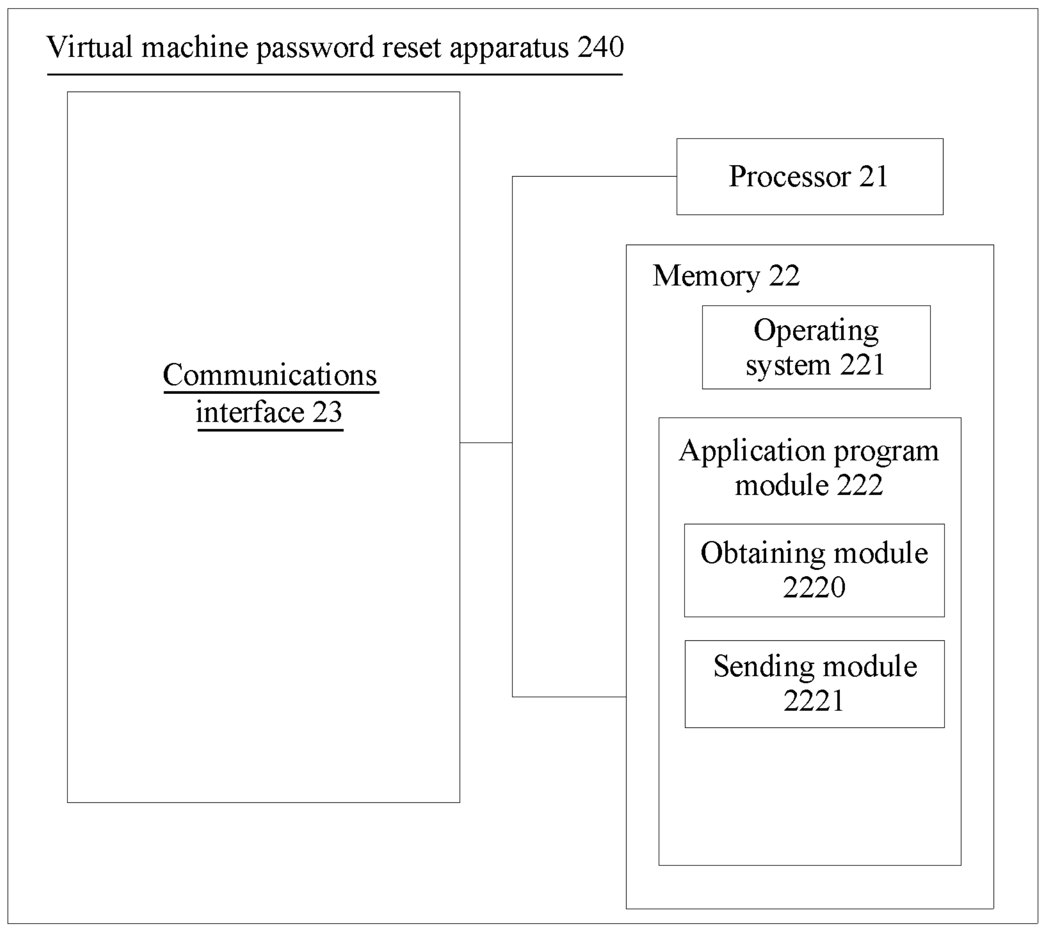
FIG. 4 is a schematic structural diagram of a virtual machine password reset apparatus according to an embodiment of the present disclosure.

FIG. 4 is a structural block diagram of a virtual machine password reset apparatus 240 according to an embodiment of the present disclosure. The virtual machine password reset apparatus 240 may be the foregoing console device. Referring to FIG. 4, the virtual machine password reset apparatus 240 may include components such as a processor 21 with one or more processing cores, a memory 22 with one or more computer readable storage media, and a communications interface 23. The processor 21 may be connected to the memory 22 and the communications interface 23 using a bus. A person skilled in the art may understand that a structure shown in FIG. 4 imposes no limitation on the virtual machine password reset apparatus 240, and the apparatus may include more or fewer components than those shown in the figure, or may combine some components, or may have different component arrangements.

For specific implementation of the processor 21, the memory 22, and the communications interface 23, refer to the foregoing descriptions about the processor 11, the memory 12, and the communications interface 13 in FIG. 3. Details are not described herein again.

A program storage area of the memory 22 may store an operating system 221 and an application program module 222 required by at least one function. The application program module 222 includes at least an obtaining module 2220 configured to obtain a reset password and a sending module 2221 configured to send a password specifying request.

The obtaining module 2220 is configured to obtain a reset password entered by a user, and the sending module 2221 is configured to send a password specifying request to the cloud service computing node, where the password specifying request includes the reset password such that the cloud service computing node saves the reset password into a metadata server.

Optionally, the processor 21 is configured to execute modules in the application program module 222, to implement steps in FIG. 6 that need to be performed.

Figure 5:
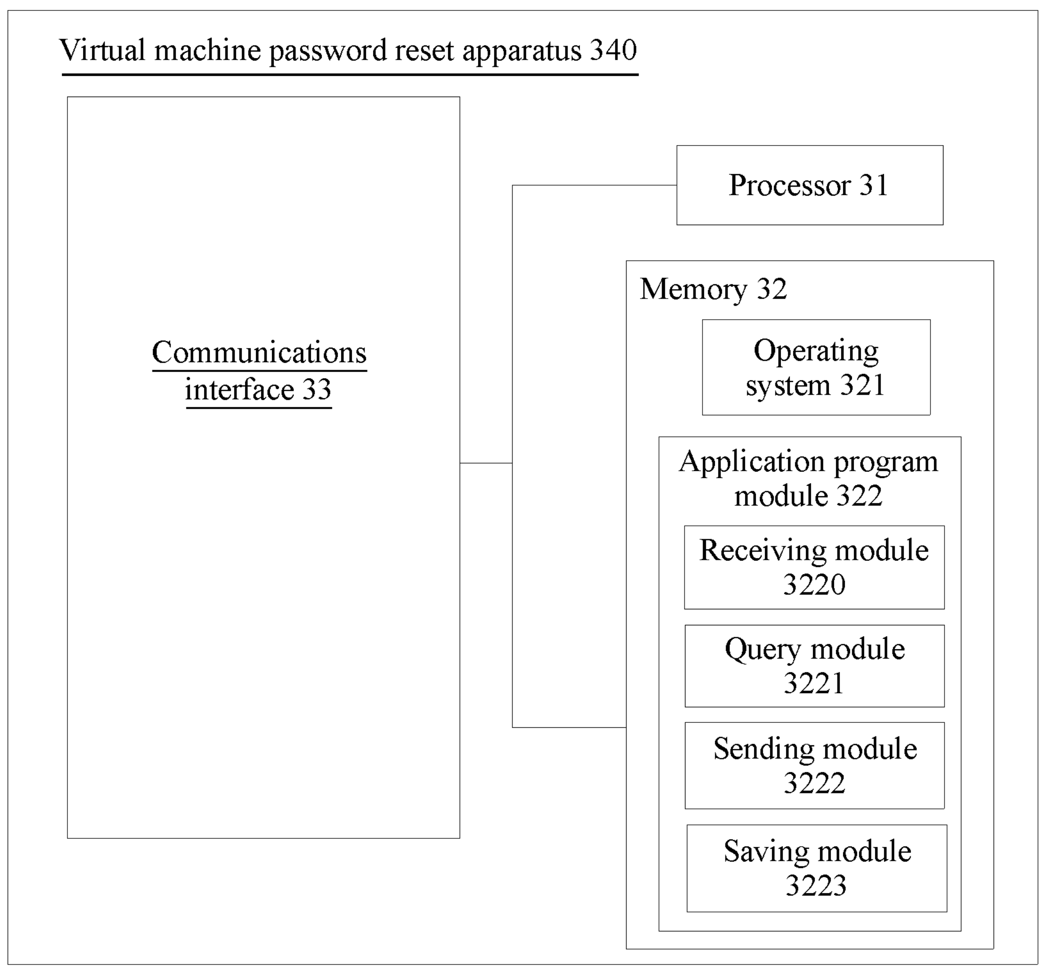
FIG. 5 is a schematic structural diagram of a virtual machine password reset apparatus according to an embodiment of the present disclosure.

FIG. 5 is a structural block diagram of a virtual machine password reset apparatus 340 according to an embodiment of the present disclosure. The virtual machine password reset apparatus 340 may be the foregoing cloud service computing node. Referring to FIG. 5, the virtual machine password reset apparatus 340 may include components such as a processor 31 with one or more processing cores, a memory 32 with one or more computer readable storage media, and a communications interface 33. The processor 31 may be connected to the memory 32 and the communications interface 33 using a bus. A person skilled in the art may understand that a structure shown in FIG. 5 imposes no limitation on the virtual machine password reset apparatus 340, and the apparatus may include more or fewer components than those shown in the figure, or may combine some components, or may have different component arrangements.

For specific implementation of the processor 31, the memory 32, and the communications interface 33, refer to the foregoing descriptions about the processor 11, the memory 12, and the communications interface 13 in FIG. 3. Details are not described herein again.

A program storage area of the memory 32 may store an operating system 321 and an application program module 322 required by at least one function. When the cloud service computing node interacts with a physical host to complete a procedure of obtaining a reset password, the application program module 322 includes at least a receiving module 3220 configured to receive a password obtaining request, a query module 3221 configured to query a reset password, and a sending module 3222 configured to send a password obtaining response.

The receiving module 3220 is configured to receive a password obtaining request sent by a virtual machine, where the password obtaining request is used to obtain a reset password of the virtual machine, the query module 3221 is configured to query the reset password of the virtual machine in a metadata server based on the password obtaining request, and the sending module 3222 is configured to send a password obtaining response to the virtual machine based on a result of querying the reset password of the virtual machine in the metadata server.

Optionally, the processor 31 is configured to execute modules in the application program module 322, to implement steps in FIG. 6 that need to be performed by a network node.

Alternatively, when the cloud service computing node interacts with a console device to complete a procedure of saving the reset password into the metadata server, the application program module 322 includes at least a receiving module 3220 configured to receive a password specifying request, and a saving module 3223 configured to save the reset password.

The receiving module 3220 is configured to receive a password specifying request sent by the console device, where the password specifying request includes the reset password, and the saving module 3223 is configured to save the reset password into the metadata server.

Optionally, the processor 31 is configured to execute modules in the application program module 322, to implement steps in FIG. 6 that need to be performed by the console device.

An embodiment of the present disclosure provides a virtual machine password reset method. Referring to FIG. 6, the virtual machine password reset method includes the following steps.

Step 100. In a virtual machine, specify a first identifier in a metadata server, where the first identifier is used to indicate whether the virtual machine has a password reset function.

In this embodiment of the present disclosure, the password reset function of the virtual machine may be implemented by installing a program in the virtual machine, for example, a password reset agent program (cloud-reset-pwd Security Agent) in the virtual machine. The password reset agent program is responsible for password reset of the virtual machine. After the password reset agent program is installed, the virtual machine specifies the first identifier in the metadata server using the password reset agent program. In this case, the first identifier indicates that the password reset agent program is installed in the virtual machine such that the virtual machine has the password reset function. Because a user may choose whether to install the password reset agent program in the virtual machine, ease of use and security are better.

Certainly, the password reset function of the virtual machine may be further implemented in another manner. For example, a password reset service is added to a virtual machine operating system, and the password reset service is responsible for password reset of the virtual machine.

In this embodiment of the present disclosure, the password reset function of the virtual machine may be started with startup of the virtual machine. The foregoing password reset agent program is used as an example. The program may be encapsulated into a system service through JAVA (for example, the password reset agent program is encapsulated into a system service through a "Java Service Wrapper" (GPL2)). The system service is included in a system auto-start item. When the system starts, the program starts. Alternatively, the password reset function of the virtual machine may be started manually, for example, when the password reset agent program is installed, the password reset function of the virtual machine is started, or the password reset agent program or the reset service of the virtual machine is restarted to start the password reset function of the virtual machine.

In this embodiment of the present disclosure, for a scenario in which a user forgets a virtual machine login password when the virtual machine is running, refer to the following for a specific implementation.

When the virtual machine does not have the password reset function defined in this embodiment of the present disclosure, and the user of the virtual machine forgets a virtual machine login password, the virtual machine login password may be changed in another manner defined in other approaches.

For example, in step 100, the virtual machine specifies the first identifier in the metadata server, where the first identifier is used to indicate whether the virtual machine has a function of performing password reset when the virtual machine is in a running state. For example, the first identifier may be in a form of a flag. When a value of the flag is "true", it indicates that the virtual machine has the foregoing password reset function, or when the value of the flag is "false", it indicates that the virtual machine does not have the foregoing password reset function. In this case, a user can change a password only in a manner described in other approaches, that is, by mounting a system disk of the virtual machine to another virtual machine, instead of performing password reset when the virtual machine is in the running state.

The virtual machine obtains a first identifier from the metadata server. If the first identifier is obtained and the first identifier indicates that the virtual machine has the password reset function, the virtual machine stops specifying the first identifier in the metadata server. If no first identifier is obtained or the first identifier indicates that the virtual machine does not have the password reset function, the virtual machine specifies the first identifier in the metadata server.

That the virtual machine specifies the first identifier in the metadata server specifically indicates that the first identifier is specified to indicate that the virtual machine does not have has the password reset function.

That the virtual machine obtains a first identifier from the metadata server may include the following.

The virtual machine sends an identifier obtaining request to a cloud service computing node, where the identifier obtaining request is used to obtain the first identifier, the cloud service computing node receives the identifier obtaining request sent by the virtual machine, the cloud service computing node obtains the first identifier from the metadata server based on the identifier obtaining request, the cloud service computing node returns an identifier obtaining response to the virtual machine, where the identifier obtaining response includes the first identifier or the identifier obtaining response indicates that the first identifier is not obtained, and the virtual machine receives the identifier obtaining response returned by the cloud service computing node.

In this embodiment of the present disclosure, the cloud service computing node is an OpenStack Nova node, and is responsible for a virtual machine control function. A nova-api-metadata component runs on the cloud service computing node, and the nova-api-metadata component provides a plurality of Nova application programming interfaces (APIs) for the virtual machine and a console device for use, where the interfaces are representational state transfer (Representational State Transfer, Restful) interfaces.

For example, the nova-api-metadata component provides an interface for the virtual machine to query whether the virtual machine has the password reset function, and the virtual machine sends an identifier obtaining request to the cloud service computing node using the interface for query.

A format of the identifier obtaining request may be as follows GET http://169.254.169.254/openstack/latest/resetpwd_flag, where GET resetpwd-flag indicates that the request is used to obtain the first identifier. It should be noted that the foregoing format of the identifier obtaining request and uniform resource locator (URL) content are only a possible implementation, and are not limited in this embodiment of the present disclosure.

A format of the identifier obtaining response returned by the cloud service computing node is as follows

```
{
    "resetpwd_flag":"True"
},
```

where resetpwd_flag is the first identifier, True indicates that the virtual machine has the password reset function, and False indicates that the virtual machine does not have the password reset function or the first identifier is not obtained.

After receiving the request of GET http://169.254.169.254/openstack/latest/resetpwd_flag, the cloud service computing node queries key=resetpwd_flag in system_metadata in the metadata server. If the key exists, the cloud service computing node returns a corresponding value, and if the key does not exist, the cloud service computing node returns False.

Further, that the virtual machine specifies the first identifier in the metadata server may include.

The virtual machine sends an identifier specifying request to the cloud service computing node, where the identifier specifying request is used to specify the first identifier in the metadata server, the cloud service computing node receives the identifier specifying request sent by the virtual machine, and the cloud service computing node specifies the first identifier in the metadata server.

In an implementation, the nova-api-metadata component in the cloud service computing node further provides an interface for the virtual machine to specify the first identifier, and the virtual machine sends the identifier specifying request to the cloud service computing node using the interface to specify the identifier.

A format of the identifier specifying request may be as follows POST http://169.254.169.254/openstack/latest/resetpwd_flag, where POST resetpwd_flag indicates that the request is used to specify the first identifier.

After the identifier specifying request is sent to the cloud service computing node, the virtual machine obtains the first identifier once again at an interval of several seconds (for example, two seconds after the identifier specifying request is sent) until the first identifier indicates that the virtual machine has the password reset function. Certainly, the virtual machine may alternatively stop obtaining the first identifier after a specified number of times is reached, for example, 10 times.

The following uses an example in which the virtual machine sends the identifier obtaining request to describe a process in which the virtual machine sends a request (including but not limited to an identifier obtaining request, an identifier specifying request, a password obtaining request, and a password deletion request) to the nova-api-metadata component of the cloud service computing node.

OpenStack runs a neutron-ns-metadata-proxy component and a neutron-metadata-agent component on a network node. The neutron-ns-metadata-proxy component obtains a router identifier (router-id) and a network identifier (network-id), and adds the router identifier and the network identifier to the identifier obtaining request. The neutron-metadata-agent component is responsible for adding an instance identifier (instance-id) and a tenant identifier (tenant-id) to the identifier obtaining request, and forwarding the received the identifier obtaining request to the nova-api-metadata component. The instance identifier is also an identifier of the virtual machine.

Figure 7:
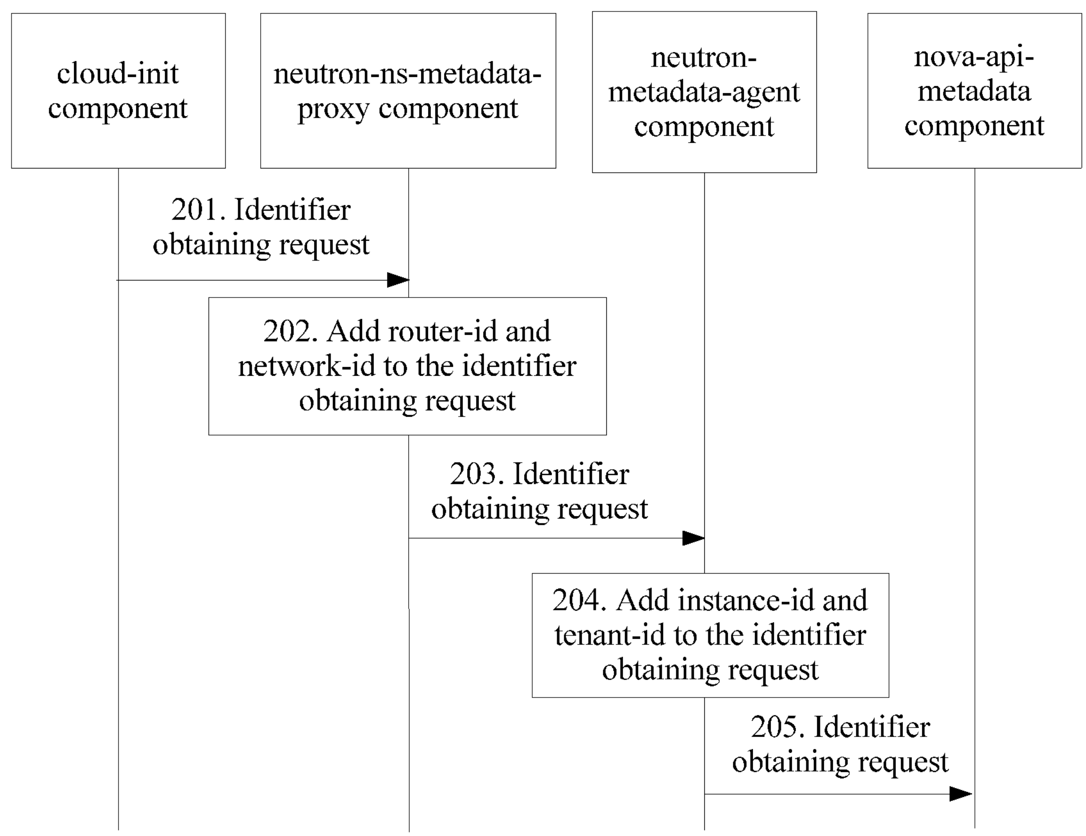
FIG. 7 is a flowchart of interaction between OpenStack components according to an embodiment of the present disclosure.

FIG. 7 is a flowchart of interaction between OpenStack components according to an embodiment of the present disclosure. As shown in FIG. 7, in step 201, a virtual machine sends the foregoing identifier obtaining request to a neutron-ns-metadata-proxy component of a network node, where the virtual machine requests a metadata service of an address 169.254.169.254 using a cloud-init component, that is, the virtual machine sends the identifier obtaining request using the cloud-init component, in step 202, the neutron-ns-metadata-proxy component adds router-id and network-id to the identifier obtaining request, in step 203, the neutron-ns-metadata-proxy component forwards the identifier obtaining request to a neutron-metadata-agent component through inter-process communication, in step 204, the neutron-metadata-agent component obtains port information based on the router-id, the network-id, and the IP address in the identifier obtaining request, and obtains corresponding instance-id and tenant-id from the port information, and then the neutron-metadata-agent component adds the instance-id and tenant-id to the identifier obtaining request, and in step 205, the neutron-metadata-agent component forwards the identifier obtaining request to a nova-api-metadata component of a cloud service computing node.

Further, a process in which the cloud-init component sends the identifier obtaining request to the neutron-ns-metadata-proxy component of the network node is as follows.

From a format of the identifier obtaining request, it may be learned that the identifier obtaining request is sent to the address 169.254.169.254. When the identifier obtaining request is sent to 169.254.169.254, there are the following two cases.

If the virtual machine is connected to a layer 3 router, the request is sent to grouter network namespace in the network node, and is processed by iptables in the grouter network namespace. The iptables forwards a data packet of 169.254.169.254: 80 to a port 9697. By monitoring the port 9697, the neutron-ns-metadata-proxy component obtains a request such as an identifier obtaining request and an identifier specifying request.

If the virtual machine is not connected to a layer-3 router, the request is sent to qdhcp network namespace in the network node. A static route is specified for a DHCP service in the qdhcp network namespace such that a packet that should have been sent to 169.254.169.254 is sent to 10.0.0.3. By monitoring a port 80, the neutron-ns-metadata-proxy component obtains a request such as an identifier obtaining request and an identifier specifying request.

A process in which the neutron-metadata-agent component obtains the port information based on the router-id, the network-id, and the IP in the request is as follows. The neutron-metadata-agent component sends a remote procedure call protocol (RPC) request to a neutron-server component, where the request includes the router-id, the network-id, and the IP. neutron-server obtains the corresponding port information based on the RPC request, and returns the port information to the neutron-metadata-agent component.

That the neutron-metadata-agent component forwards the identifier obtaining request to a nova-api-metadata component of a cloud service computing node may further include the following. The neutron-metadata-agent component sends the identifier obtaining request to a HAProxy component, and the HAProxy component forwards the identifier obtaining request to the nova-api-metadata component, where the HAProxy component is configured to perform traffic control.

For example, the inter-process communication between the neutron-ns-metadata-proxy component and the neutron-metadata-agent component may be implemented using a Unix domain socket technology.

The router-id, the network-id, the instance-id, and the tenant-id are specifically added to the hypertext transfer protocol (HTTP) header of the identifier obtaining request.

The nova-api-metadata component extracts corresponding information from the HTTP header of the identifier obtaining request, obtains the instance-id and the tenant-id of the virtual machine, reads metadata information (including the first identifier of the virtual machine) of the virtual machine from a database of the metadata server, and finally returns a result.

In this embodiment of the present disclosure, step 100 is an optional step, and the first identifier may be specified in another manner, for example, the first identifier is manually specified in the metadata server.

Step 101. When a console device obtains a virtual machine password reset instruction entered by a user, the console device determines whether the virtual machine has the password reset function, where if the virtual machine has the password reset function, step 102 is performed, or if the virtual machine does not have the password reset function, a subsequent step is not performed.

In step 101, the virtual machine is a virtual machine corresponding to the virtual machine password reset instruction. When sending the password reset instruction, the user selects a virtual machine for which password reset needs to be performed. Therefore, the password reset instruction carries a virtual machine identification (ID), and the virtual machine ID corresponds to the instance-id.

In this embodiment of the present disclosure, the virtual machine includes a plurality of identifiers, which are the foregoing virtual machine ID, the instance-id, and a UUID. The UUID and the instance-id are generated when the virtual machine is created. The UUID is generated by a VMM, and the instance-id is entered by the user. When being created, the virtual machine is assigned to a project (which may be a tenant), and the virtual machine ID is an identifier indicating that the virtual machine is in the project.

The virtual machine ID may be used when the user controls the virtual machine using the console device, and a control instruction generated when the user controls the virtual machine carries the virtual machine ID. The instance-id is an ID used by the cloud service computing node to control the virtual machine, and the instance-id is carried in a request sent by the virtual machine to the cloud service computing node. The virtual machine UUID is an ID that can uniquely distinguish between virtual machines, and is unique. The UUID is stored in the metadata server and may be used to encrypt or decrypt a reset password.

In this step, that the console device determines whether the virtual machine has the password reset function may include the following. The console device sends an identifier obtaining request to the cloud service computing node, where the identifier obtaining request is used to obtain the first identifier, after receiving the identifier obtaining request, the cloud service computing node obtains the first identifier from the metadata server, based on a first identifier obtaining result, the cloud service computing node sends an identifier obtaining response to the console device, where the identifier obtaining response is generated after the cloud service computing node queries the first identifier in the metadata server, and the identifier obtaining response includes the first identifier or the identifier obtaining response indicates that the first identifier is not obtained, the console device receives the identifier obtaining response returned by the cloud service computing node, and the console device determines, based on the identifier obtaining response, whether the virtual machine has the password reset function.

In this embodiment of the present disclosure, the nova-api-metadata component provides an interface for the console device to query whether the virtual machine has the password reset function, and through the interface, the console device sends the identifier obtaining request to the cloud service computing node for query.

Therefore, a format of the identifier obtaining request sent by the console device is different from that of the identifier obtaining request sent by the virtual machine. The format of the identifier obtaining request sent by the console device is GET/{project_id}/servers/{server_id}/os-resetpwd-flag, where project_id is a project identifier, server_id is the foregoing virtual machine ID, and os-resetpwd-flag indicates that the request is used to obtain the first identifier.

A format of the identifier obtaining response returned by the cloud service computing node is as follows.

```
{
    "resetpwd__flag":"True"
},
```

where resetpwd_flag is the first identifier, True indicates that the virtual machine has the password reset function, and False indicates that the virtual machine does not have the password reset function or the first identifier is not obtained.

After receiving the request of GET/{project_id}/servers/{server_id}/os-resetpwd-flag, the cloud service computing node queries key=resetpwd_flag in system_metadata in the metadata server. If the key exists, a corresponding value is returned, and if the key does not exist, False is returned. Based on a value of resetpwd_flag in the identifier obtaining response, the console device determines whether the virtual machine has the password reset function. If the value is True, it indicates that the virtual machine has the password reset function, or if the value is False, it indicates that the virtual machine does not have the password reset function.

Figure 8:
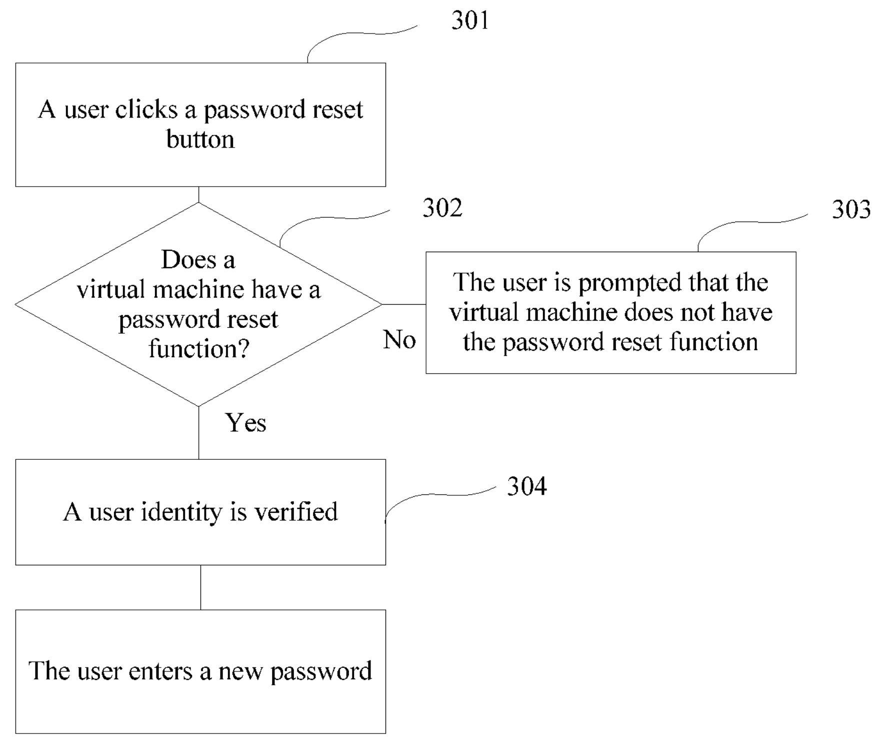
FIG. 8 is a detailed flowchart of a password reset method according to an embodiment of the present disclosure.
Figure 9:
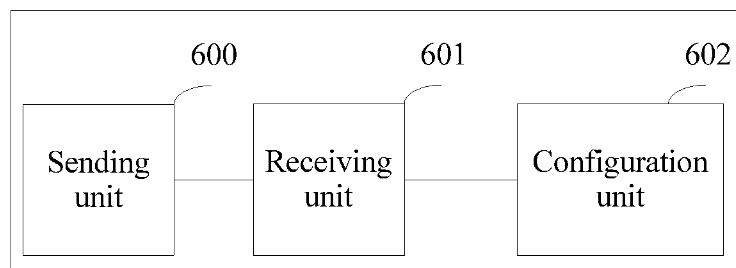
FIG. 9 is a schematic structural diagram of a virtual machine password reset apparatus according to an embodiment of the present disclosure.

FIG. 8 is a detailed flowchart of steps performed by a console device according to an embodiment of the present disclosure. With reference to FIG. 8, the following describes step 101 in detail.

In step 301, a console device detects that a user clicks a password reset button. In step 302, based on a first identifier, the console device determines whether a virtual machine has a password reset function. If the virtual machine does not have the password reset function, step 303 is performed. If the virtual machine has the password reset function, step 304 is performed. In step 303, the console device prompts, on a console interface, that the user's virtual machine does not have the password reset function. In step 304, the console device verifies an identity of the user, to prevent another user under a same tenant name from resetting a virtual machine password without authorization. After step 304 is completed, step 102 is performed.

For example, a manner of performing identity verification on the user includes but is not limited to sending a verification code to a mobile phone or a mailbox of the user. Because a same tenant may have a plurality of users, and only some of the plurality of users may have a permission to reset a password, performing identity verification on a user prevents an unauthorized user from performing password reset.

Step 102. The console device obtains a reset password entered by the user.

When it is determined that the virtual machine has the password reset function, the reset password entered by the user using a console device interface is obtained. To prevent an entry error of the user, the console device provides a reset password input box and a reset password confirmation box. When the user enters a same password twice, the reset password entered by the user is obtained.

Step 103. The console device sends a password specifying request to a cloud service computing node, where the password specifying request includes the reset password.

The console device sends the reset password to the cloud service computing node such that the cloud service computing node may save the reset password into a metadata server, for acquisition and use by the virtual machine during password reset. The reset password is sent using the password specifying request.

For example, the console device may transparently transmit the reset password to the cloud service computing node in a hypertext transfer protocol secure (HTTPS) manner.

A nova-api-metadata component provides an interface for the console device to send the reset password, and the console device sends the password specifying request to the cloud service computing node using the interface, where the password specifying request includes the reset password.

For example, the console device sends the reset password to the cloud service computing node using the password specifying request in the following format PUT/{project_id}/servers/{server_id}/os-reset-password-d '{"reset-password": {"new_password": "Fusion@123"}}', where Fusion@ 123 is the reset password.

Step 104. The cloud service computing node receives the password specifying request sent by the console device.

In an embodiment, the cloud service computing node receives the password specifying request sent by the console device, and obtains the reset password from a preset field based on the format, for example, the reset password Fusion@ 123 is obtained from PUT/{project_id}/servers/

{server_id}/os-reset-password-d '{"reset-password": {"new_password":"Fusion @ 123"}}'.

Step 105. The cloud service computing node saves the reset password in the password specifying request into the metadata server.

In this step, that the cloud service computing node saves the reset password to the metadata server may include the following.

The cloud service computing node encrypts the reset password, and saves the encrypted reset password into the metadata server.

Further, the cloud service computing node encrypts the reset password using an AES encryption algorithm. A specific process is as follows.

Step 1. The cloud service computing node obtains a UUID of the virtual machine.

Step 2. Generate a random number as a salt.

Step 3. Generate a key based on the UUID of the virtual machine and the salt.

Specifically, a key DK may be generated through derivation using the PBKDF2 algorithm, where DK=PBKDF2(P, S,c,dkLen), P represents a password, the password is the UUID of the foregoing virtual machine, S represents a salt, c represents a quantity of iterations, and dkLen is a key length.

For example, the salt may be an 8-bit random number, the quantity of iterations may be 5000, and the key length may be 128 bits.

The UUID of the virtual machine is used to identify the virtual machine, and the UUID of the virtual machine is unique.

Step 4. The cloud service computing node encrypts the reset password using the key, to generate a ciphertext.

The encryption algorithm may be specifically the AES_256_CBC encryption algorithm, the foregoing encryption key is used for key/value, and a padding manner is PKCS5Padding.

Step 5. Save the salt and the ciphertext together as an encrypted reset password into the metadata server.

After the encryption is completed, BASE64 encoding is performed on the ciphertext, BASE64 encoding is performed on the foregoing salt, and the encoded salt and ciphertext are saved into the metadata server.

For example, the encoded salt and ciphertext are saved into system_metadata of the metadata server. Because each entry in system_metadata has a limited length, the encoded salt and ciphertext may be stored in different entries. For example, the encoded salt and ciphertext are divided into four segments, and a format of each segment is key=reset_password_x, where x is 0, 1, 2, or 3, and x represents a sequence number of the segment.

In this embodiment of the present disclosure, the cloud service computing node saves the encrypted reset password into a database table system_metadata of the metadata server in the following format/{project_id}/servers/{server_id}/os-reset-password, where os-reset-password is the encrypted reset password.

Step 106. The cloud service computing node controls the virtual machine to reboot, to trigger an entire password reset procedure.

In this embodiment of the present disclosure, the password reset procedure is performed in a virtual machine reboot process.

In this embodiment of the present disclosure, the cloud service computing node reboots the virtual machine by performing a reboot operation on the virtual machine. Further, the cloud service computing node controls the virtual machine to reboot by sending an OpenStack virtual machine reset command.

Step 107. When the virtual machine is rebooted, the virtual machine sends a password obtaining request to the cloud service computing node, where the password obtaining request is used to obtain the reset password of the virtual machine.

A process in which the virtual machine sends the password obtaining request to the cloud service computing node is the same as a process in which the virtual machine sends an identifier obtaining request and an identifier specifying request to the cloud service computing node in step 100, but interfaces used for sending the requests are different.

Further, the nova-api-metadata component provides an interface for the virtual machine to obtain the reset password, and using the interface, the virtual machine sends the password obtaining request to the cloud service computing node for query.

A format of the password obtaining request may be as follows GET http://169.254.169.254/openstack/latest/reset_password, where GET reset_password indicates that the request is used to obtain a reset password.

Step 108. The cloud service computing node receives the password obtaining request sent by the virtual machine.

Step 109. The cloud service computing node obtains the reset password of the virtual machine from the metadata server based on the password obtaining request.

In this step, that the cloud service computing node obtains the reset password of the virtual machine from the metadata server based on the password obtaining request may include the following.

The cloud service computing node obtains an instance identifier and a tenant identifier in the password obtaining request, and the cloud service computing node queries the reset password of the virtual machine in the metadata server based on the instance identifier and the tenant identifier.

For example, when receiving the password obtaining request, the cloud service computing node obtains key=reset_password_x from system_metadata, and then combines the four key values of x=[0,3] and returns a combined value to the virtual machine. If a query result is that no reset password is specified, the cloud service computing node returns None. If a returned value is None, no password needs to be reset for the virtual machine.

Step 110. The cloud service computing node sends a password obtaining response to the virtual machine, where when the cloud service computing node obtains the reset password of the virtual machine from the metadata server, the password obtaining response includes the reset password.

Step 111. The virtual machine receives the password obtaining response returned by the cloud service computing node.

If the virtual machine does not receive the password obtaining response returned by the cloud service computing node within a specified time, it indicates that the request fails. In this case, the virtual machine re-sends the password obtaining request. The specified time may be an interval of two seconds, and a maximum of times of repeatedly sending the password obtaining request may be 10. If the password obtaining response fails to be returned for 10 times, no password is reset.

Step 112. When the password obtaining response includes the reset password, the virtual machine configures the reset password as a password of the virtual machine.

In this step, that the virtual machine configures the reset password as a password of the virtual machine may include the following.

The virtual machine decrypts the obtained reset password, where the reset password saved in the metadata server is an encrypted reset password, and the virtual machine configures the decrypted reset password as the password of the virtual machine.

When the password obtaining response does not include the reset password, no operation is performed.

The virtual machine decrypts the reset password using an AES algorithm. A specific process is as follows.

In step 1, the virtual machine obtains the UUID of the virtual machine. In step 2, the salt is extracted from the encrypted reset password. In step 3, a key is generated based on the UUID of the virtual machine and the salt, the ciphertext is extracted from the encrypted reset password, and the ciphertext is decrypted using the key to obtain a plaintext password.

For example, a process in which the virtual machine obtains the UUID of the virtual machine may be as follows. The virtual machine sends a GET meta_data.json request to the metadata server, and obtains the UUID of the virtual machine from a returned value of the metadata server.

Then, BASE64 decoding is performed on the first 12 bits of the reset password to obtain the salt, and the key is generated in a same manner in step 104 in which the key is derived using PBKDF2. The first 12 bits of the reset password are removed and BASE64 decoding is performed to obtain the ciphertext, and the key is used to perform AES decryption to obtain the plaintext password. AES_256_CBC is used as a decryption algorithm, and the foregoing key is used for key/value.

In this step, configuring the reset password for the virtual machine system may include using net user Administrator $password to reset a password for a Windows system, and using echo 'root:$password'|chpasswd to reset a password for a Linux system, where the password is a reset password.

Step 113. The virtual machine deletes the reset password in the metadata server.

Further, after completing password reset, the virtual machine deletes the reset password in the metadata server, to avoid repeatedly performing password reset using a same reset password.

In this step, that the virtual machine deletes the reset password in the metadata server may include sending, by the virtual machine, a password deletion request to the cloud service computing node, where the password deletion request is used to delete the reset password from the metadata server, receiving, by the cloud service computing node, the password deletion request sent by the virtual machine, and deleting, by the cloud service computing node, the reset password from the metadata server.

A process in which the virtual machine sends the password deletion request to the cloud service computing node is the same as the process in which the virtual machine sends an identifier obtaining request and an identifier specifying request to the cloud service computing node in step 100, but interfaces used for sending the requests are different.

Further, the nova-api-metadata component provides an interface for the virtual machine to delete the reset password, and using the interface, the virtual machine sends the password deletion request to the cloud service computing node for deletion.

A format of the password deletion request may be as follows DELETE http://169.254.169.254/openstack/latest/reset_password, where DELETE reset_password indicates that the request is used to delete the reset password.

The virtual machine sends the password deletion request to the cloud service computing node. When receiving the password deletion request, the cloud service computing node deletes a record of key=reset_password_x in system_metadata.

To ensure that the reset password in the metadata server has been deleted, the virtual machine sends a password obtaining request again several seconds after sending the password deletion request. If the returned password obtaining response does not include the reset password, the reset password is deleted successfully. If the deletion fails, the password deletion request needs to be sent again. The foregoing steps are repeated until the deletion succeeds, and a maximum quantity of repetitions is 10.

After the foregoing password reset procedure is executed, a password reset agent program or a password reset service stops running until the virtual machine restarts a next time, or the user manually restarts the password reset agent program or the password reset service.

An embodiment of the present disclosure provides a virtual machine password reset apparatus. The virtual machine password reset apparatus may be the foregoing physical host.

The virtual machine password reset apparatus may be implemented as a whole or a part of the foregoing physical host using a dedicated hardware circuit or a combination of software and hardware. The virtual machine password reset apparatus includes a sending unit 600, a receiving unit 601, and a configuration unit 602. Each unit may be implemented using a dedicated hardware logic circuit or a software module. The sending unit 600 is configured to send a password obtaining request to a cloud service computing node, where the password obtaining request is used to obtain a reset password of a virtual machine, the receiving unit 601 is configured to receive a password obtaining response returned by the cloud service computing node, where the password obtaining response is generated after the cloud service computing node queries the reset password of the virtual machine in a metadata server, and the configuration unit 602 is configured to configure the reset password as a password of the virtual machine when the password obtaining response includes the reset password.

In this embodiment of the present disclosure, the configuration unit 602 may be configured to obtain a UUID of the virtual machine, extract a salt from the encrypted reset password, generate a key based on the UUID of the virtual machine and the salt, extract a ciphertext from the encrypted reset password, and decrypt the ciphertext using the key to obtain a plaintext password, and configure the plaintext password as the password of the virtual machine.

In this embodiment of the present disclosure, the sending unit 600 may be further configured to send an identifier obtaining request to the cloud service computing node, where the identifier obtaining request is used to obtain a first identifier, and the first identifier is used to indicate whether the virtual machine has a password reset function, the receiving unit 601 may be further configured to receive an identifier obtaining response returned by the cloud service computing node, where the identifier obtaining response is generated after the cloud service computing node queries the first identifier in the metadata server, and the sending unit 600 may be further configured to specify the first identifier in the metadata server when the identifier obtaining response indicates that the first identifier is not obtained, or the first identifier in the identifier obtaining response indicates that the virtual machine does not have the password reset function.

In this embodiment of the present disclosure, the sending unit 600 may be configured to send an identifier specifying request to the cloud service computing node such that the cloud service computing node specifies the first identifier in the metadata server.

In this embodiment of the present disclosure, the sending unit 600 may be further configured to send a password deletion request to the cloud service computing node such that the cloud service computing node deletes the reset password of the virtual machine from the metadata server.

For related details, refer to the method embodiment in FIG. 6.

It should be noted that the foregoing configuration unit 602 may be implemented by a processor or by a processor by executing a program instruction in a memory. The sending unit 600 and the receiving unit 601 may be implemented by a communications interface or by a combination of a communications interface and a processor.

Figure 10:
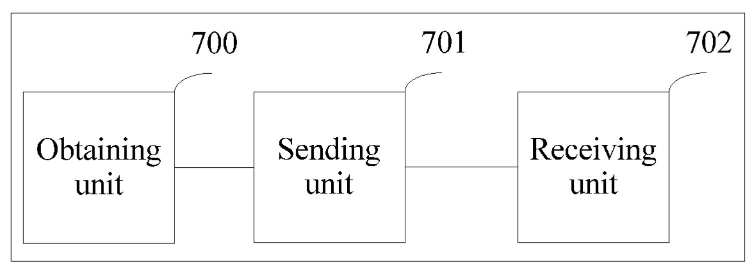
FIG. 10 is a schematic structural diagram of a virtual machine password reset apparatus according to an embodiment of the present disclosure.

An embodiment of the present disclosure provides a virtual machine password reset apparatus. The virtual machine password reset apparatus may be the foregoing console device. Referring to FIG. 10, the virtual machine password reset apparatus includes the following.

The virtual machine password reset apparatus may be implemented as a whole or a part of the foregoing console device using a dedicated hardware circuit or a combination of software and hardware. The virtual machine password reset apparatus includes an obtaining unit 700 and a sending unit 701. Each unit may be implemented using a dedicated hardware logic circuit or a software module. The obtaining unit 700 is configured to obtain a reset password entered by a user, and the sending unit 701 is configured to send a password specifying request to a cloud service computing node, where the password specifying request includes the reset password such that the cloud service computing node saves the reset password into a metadata server.

In this embodiment of the present disclosure, the obtaining unit 700 may be configured to determine, when the console device obtains a virtual machine password reset instruction, whether a virtual machine has a password reset function, where the virtual machine password reset instruction is used to instruct the virtual machine to perform password reset, and obtain the reset password when the virtual machine has the password reset function.

In this embodiment of the present disclosure, the sending unit 701 may be further configured to send an identifier obtaining request to the cloud service computing node, where the identifier obtaining request is used to obtain a first identifier, and the first identifier is used to indicate whether the virtual machine has the password reset function, the apparatus may further include a receiving unit 702 configured to receive an identifier obtaining response returned by the cloud service computing node, where the identifier obtaining response is generated after the cloud service computing node queries the first identifier in the metadata server, and the obtaining unit 700 may be configured to determine, based on the identifier obtaining response, whether the virtual machine has the password reset function.

For related details, refer to the method embodiment in FIG. 6.

It should be noted that the foregoing obtaining unit 700, the sending unit 701, and the receiving unit 702 may be implemented by a communications interface or by a combination of a communications interface and a processor.

Figure 11:
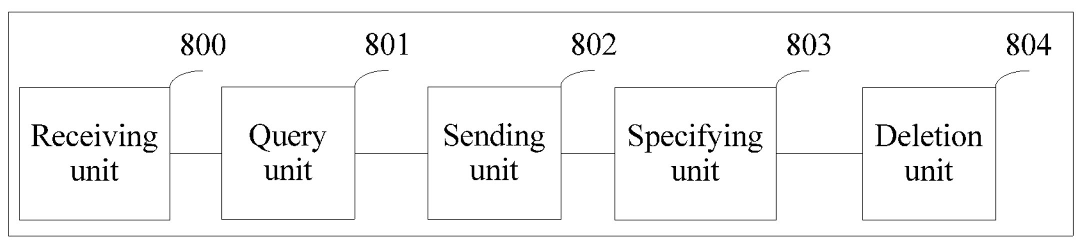
FIG. 11 is a schematic structural diagram of a virtual machine password reset apparatus according to an embodiment of the present disclosure.
Figure 12:
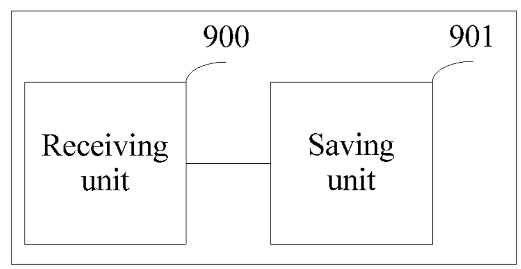
FIG. 12 is a schematic structural diagram of a virtual machine password reset apparatus according to an embodiment of the present disclosure.

An embodiment of the present disclosure provides a virtual machine password reset apparatus. The virtual machine password reset apparatus may be the foregoing cloud service computing node. Referring to FIG. 11, the virtual machine password reset apparatus includes the following.

The virtual machine password reset apparatus may be implemented as a whole or a part of the foregoing cloud service computing node using a dedicated hardware circuit or a combination of software and hardware. The virtual machine password reset apparatus includes a receiving unit 800, a query unit 801, and a sending unit 802. Each unit may be implemented using a dedicated hardware logic circuit or a software module. The receiving unit 800 is configured to receive a password obtaining request sent by a virtual machine, where the password obtaining request is used to obtain a reset password of the virtual machine, the query unit 801 is configured to query the reset password of the virtual machine in a metadata server based on the password obtaining request, and the sending unit 802 is configured to send a password obtaining response to the virtual machine based on a result of querying the reset password of the virtual machine in the metadata server.

In this embodiment of the present disclosure, the receiving unit 800 may be further configured to receive an identifier obtaining request sent by the virtual machine, where the identifier obtaining request is used to obtain a first identifier, and the first identifier is used to indicate whether the virtual machine has a password reset function, the query unit 801 may be further configured to query the first identifier in the metadata server based on the identifier obtaining request, and the sending unit 802 may be further configured to return an identifier obtaining response to the virtual machine based on a result of querying the first identifier in the metadata server.

In this embodiment of the present disclosure, the receiving unit 800 may be further configured to receive an identifier specifying request sent by the virtual machine, where the identifier specifying request is used to specify the first identifier in the metadata server, and the apparatus may further include a specifying unit 803 configured to specify the first identifier in the metadata server.

In this embodiment of the present disclosure, the receiving unit 800 may be further configured to receive a password deletion request sent by the virtual machine, where the password deletion request is used to delete the reset password from the metadata server, and the apparatus may further include a deletion unit 804 configured to delete the reset password from the metadata server.

For related details, refer to the method embodiment in FIG. 6.

It should be noted that the foregoing query unit 801, the specifying unit 803, and the deletion unit 804 may be implemented by a processor or by a processor by executing a program instruction in a memory. The receiving unit 800 and the sending unit 802 may be implemented by a communications interface or by a combination of a communications interface and a processor.

An embodiment of the present disclosure provides a virtual machine password reset apparatus. The virtual machine password reset apparatus may be the foregoing cloud service computing node.

The virtual machine password reset apparatus may be implemented as a whole or a part of the foregoing cloud service computing node using a dedicated hardware circuit or a combination of software and hardware. The virtual machine password reset apparatus includes a receiving unit 900 and a saving unit 901. Each unit may be implemented using a dedicated hardware logic circuit or a software module. The receiving unit 900 is configured to receive a password specifying request sent by a console device, where the password specifying request includes the reset password, and the saving unit 901 is configured to save the reset password into a metadata server.

In this embodiment of the present disclosure, the saving unit 901 may be configured to obtain a UUID of the virtual machine, generate a random number as a salt, generate a key based on the UUID of the virtual machine and the salt, encrypt the reset password using the key to generate a ciphertext, and save the salt and the ciphertext together as an encrypted reset password into the metadata server.

For related details, refer to the method embodiment in FIG. 6.

It should be noted that the foregoing saving unit 901 may be implemented by a processor or by a processor by executing a program instruction in a memory. The receiving unit 900 may be implemented by a communications interface or by a combination of a communications interface and a processor.

It should be noted that, when the virtual machine password reset apparatus provided in the foregoing embodiments performs virtual machine password reset, division of the function modules is only used as an example for description. In practical application, the functions may be allocated to different function modules for implementation as required, that is, an internal structure of a device is divided into different function modules to implement all or some of the functions described above. In addition, the virtual machine password reset apparatus provided in the foregoing embodiments pertains to a same concept as the embodiments of the virtual machine password reset method. For a specific implementation process, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A virtual machine password reset method, wherein the virtual machine password reset method comprises:

obtaining, by a console device, a reset password by a user of a virtual machine running on a physical host that is separated from the console device, wherein the virtual machine has a password reset function;

sending, by the console device, a password specifying request including the reset password to a cloud service computing node, wherein the cloud service computing node saves the reset password into a metadata server in response to receiving the password specifying request from the console device;

sending, by the virtual machine, a password obtaining request to the cloud service computing node;

receiving, b the virtual machine a password obtaining response from the cloud service computing node in response to sending the password obtaining request, wherein the password obtaining responses is received after the password obtaining request permits the cloud service computing node to query the reset password in the metadata server, and wherein the password obtaining response comprises the reset password; and automatically resetting, by the virtual machine, a password of the virtual machine by configuring the reset password as the password of the virtual machine.

2. The virtual machine password reset method of claim 1, wherein the reset password in the metadata server is an encrypted reset password, and wherein configuring the reset password as the password of the virtual machine comprises:

obtaining a universally unique identifier of the virtual machine;

extracting a salt from the encrypted reset password;

generating a key based on the universally unique identifier of the virtual machine and the salt;

extracting a ciphertext from the encrypted reset password;

decrypting the ciphertext using the key to obtain a plaintext password; and configuring the plaintext password as the password of the virtual machine.

3. The virtual machine password reset method of claim 1, further comprising the virtual machine sends a password deletion request to the cloud service computing node to enable the cloud service computing node to delete the reset password from the metadata server.

4. A virtual machine password reset system, comprising:

a physical host comprising a virtual machine, wherein the virtual machine is configured to:

send a password obtaining request;

receive a password obtaining response in response to sending the password obtaining request; and automatically reset a password of the virtual machine by configuring the reset password as the password of the virtual machine, when the password obtaining response comprises the reset password;

a cloud service computing node coupled to the physical host and configured to:

receive a password specifying request;

send the reset password;

receive the password obtaining request from the virtual machine;

query the reset password of the virtual machine based on the password obtaining request to obtain a result; and send the password obtaining response to the virtual machine based on the result;

a metadata server coupled to the cloud service computing node and configured to save the reset password; and a console device separated from the physical host and coupled to the cloud service computing node and configured to:

obtain the reset password that is entered by a user of the virtual machine on the console device; and send the password specifying request, wherein the password specifying request comprises the reset password.

5. The virtual machine password reset system of claim 4, wherein the cloud service computing node is further configured to:

obtain a universally unique identifier of the virtual machine;

generate a random number as a salt;

generate a key based on the universally unique identifier of the virtual machine and the salt;

encrypt the reset password using the key to generate a ciphertext; and save the salt and the ciphertext together as an encrypted reset password into the metadata server, and wherein the virtual machine is further configured to:

obtain the universally unique identifier of the virtual machine;

extract the salt from the encrypted reset password;

generate the key based on the universally unique identifier of the virtual machine and the salt;

extract the ciphertext from the encrypted reset password;

decrypt the ciphertext using the key to obtain a plaintext password; and configure the plaintext password as the password of the virtual machine.

6. The virtual machine password reset system of claim 4, wherein the console device is further configured to send an identifier obtaining request to the cloud service computing node, wherein the identifier obtaining request is used to obtain a first identifier, wherein the first identifier indicates whether the virtual machine has a password reset function, and wherein the cloud service computing node is further configured to:

query the first identifier in the metadata server based on the identifier obtaining request; and return an identifier obtaining response to the console device based on the result of querying the first identifier in the metadata server, and wherein the console device is further configured to:

receive the identifier obtaining response returned by the cloud service computing node; and determine, based on the identifier obtaining response, whether the virtual machine has the password reset function.

7. The virtual machine password reset system of claim 6, wherein the virtual machine is further configured to send a password deletion request to the cloud service computing node, wherein the password deletion request is used to delete the reset password from the metadata server, and wherein the cloud service computing node is further configured to:

receive the password deletion request from the virtual machine; and delete the reset password from the metadata server.

8. The virtual machine password reset system of claim 4, wherein the virtual machine is further configured to install a password reset agent program.

9. The virtual machine password reset system of claim 8, wherein after installing the password reset agent program, the virtual machine is further configured to specify a first identifier in the metadata server.

10. The virtual machine password reset system of claim 4, wherein the cloud service computing node is further configured to control the virtual machine to restart.

11. The virtual machine password reset system of claim 4, wherein the cloud service computing node is further configured to run an elastic cloud server console to implement interaction with the user.

12. The virtual machine password reset system of claim 4, wherein the cloud service computing node is an OpenStack Nova node.

13. The virtual machine password reset system of claim 12, wherein the cloud service computing node is configured to provide a plurality of application programming interfaces for the virtual machine and the console device, wherein the application programming interfaces are representational state transfer interfaces.

* * * * *

UNITED STATES PATENT AND TRADEMARK OFFICE

CERTIFICATE OF CORRECTION

PATENT NO. : 11,714,669 B2
APPLICATION NO. : 16/749697
DATED : August 1, 2023
INVENTOR(S) : Sibiao Luo It is certified that error appears in the above-identified patent and that said Letters Patent is hereby corrected as shown below:

In the Claims

Claim 1, Column 25, Line 64: receiving, b the virtual should read receiving, by the virtual Signed and Sealed this
Twenty-sixth Day of September, 2023

Katherine Kelly Vidal

Katherine Kelly Vidal
*Director of the United States Patent and Trademark Office*